United States Patent [19]

Iwamoto et al.

[11] 4,408,883
[45] Oct. 11, 1983

[54] APPARATUS FOR INSPECTING AVERAGE SIZE OF FUNDAMENTAL PATTERNS

[75] Inventors: Akito Iwamoto, Kamakura; Hidekazu Sekizawa, Yokohama, both of Japan

[73] Assignee: Tokyo Shibaura Denki Kabushiki Kaisha, Kawasaki, Japan

[21] Appl. No.: 240,603

[22] Filed: Mar. 4, 1981

[30] Foreign Application Priority Data

Mar. 6, 1980 [JP] Japan .................................. 55-27321

[51] Int. Cl.³ .......................... G01B 11/00; G01B 9/02
[52] U.S. Cl. ..................................... 356/355; 356/394
[58] Field of Search ................................. 356/354–355, 356/357, 384, 394; 340/146.3 P; 350/162 SF; 250/550

[56] References Cited

U.S. PATENT DOCUMENTS

| | | | |
|---|---|---|---|
| 3,441,351 | 4/1969 | Bell et al. | 356/404 |
| 3,806,251 | 4/1974 | Dandliker et al. | 356/355 |
| 3,954,337 | 5/1976 | Ragland, Jr. | 356/355 |
| 4,200,396 | 4/1980 | Kleinknecht et al. | 356/394 |
| 4,298,285 | 11/1981 | Ito | 356/394 |

FOREIGN PATENT DOCUMENTS 17371 10/1980 European Pat. Off. .

OTHER PUBLICATIONS

IBM Journal of Research and Development, "Dimensional Measurement and Defect Detection Using Spatial Filtering",. A. L. Flamholz et al., No. 6, Nov. 1973.
Chapman et al., "A Fourier Transform Method for the Verification of Wire Screens for Standard Sieves" Jr. Phys. E. Sci. Instru. 6-1977 pp. 621–626.
Dickey et al., "An Optical Open Area Ratiometer" Optical Engineering" 9/10/80, pp. 793–796 & SPIE Seminar Feb. 6/7/80, L. A. Cal.
Firseter et al., "Method for Measuring the Average Aperture Size of a Plurality of Apertures in a Kinescope Shadow Mask" RCA Tech. Note 1143, 3/76.

Primary Examiner—William H. Punter
Attorney, Agent, or Firm—Oblon, Fisher, Spivak, McClelland & Maier

[57] ABSTRACT

An apparatus for determining the average size of fundamental patterns contained in a given region of an object to be inspected, which includes Fourier transform means for producing output data corresponding to a Fourier transform pattern image of the given region of the object, and processor means for processing the output data to provide the actual pattern size information. The Fourier transform means includes a Fourier converter for providing the output data corresponding to Fourier transform patterns. The processor means includes an extractor coupled to the Fourier transform means for extracting a single magnitude data ($I_n$) representing the order n of spatial frequency component (e.g. 200) from the output data, the magnitude of the order n component changing with variation (e.g. $\Delta a_H$) of the size of patterns; and a data processor coupled to the extractor for determining the average size of patterns in the given region according to the single magnitude ($I_n$) and providing the actual pattern size information indicating the averge size of the patterns.

40 Claims, 29 Drawing Figures

ENLARGED PATTERN

REDUCTED PATTERN

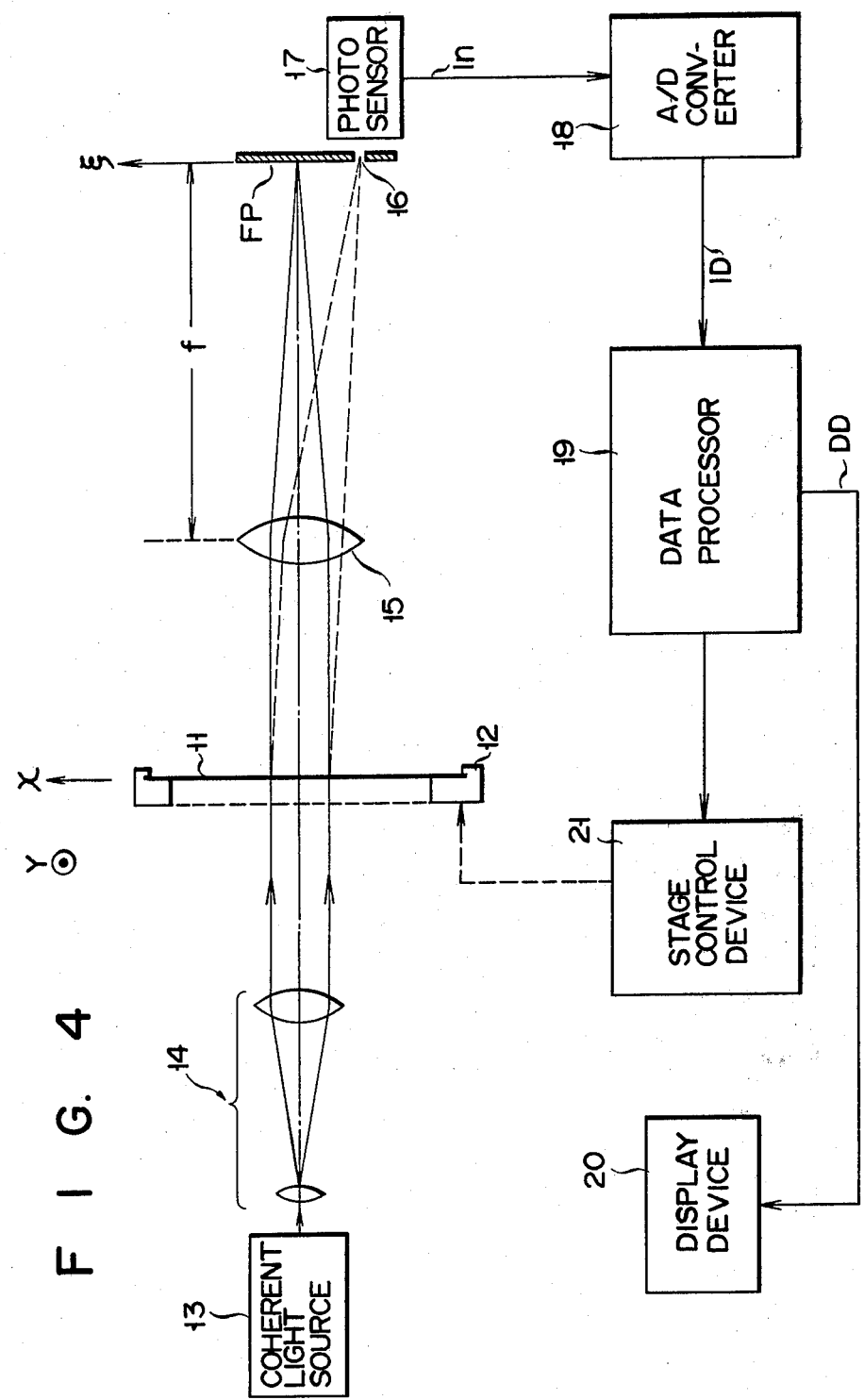

F I G. 11
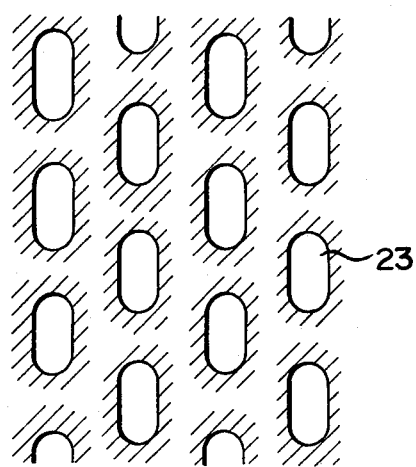
F I G. 12
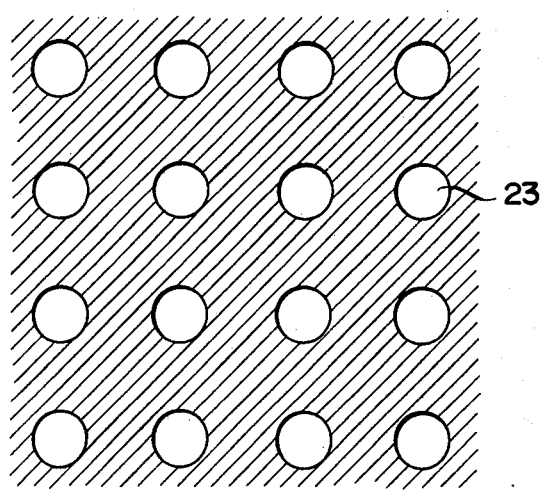

F I G. 13
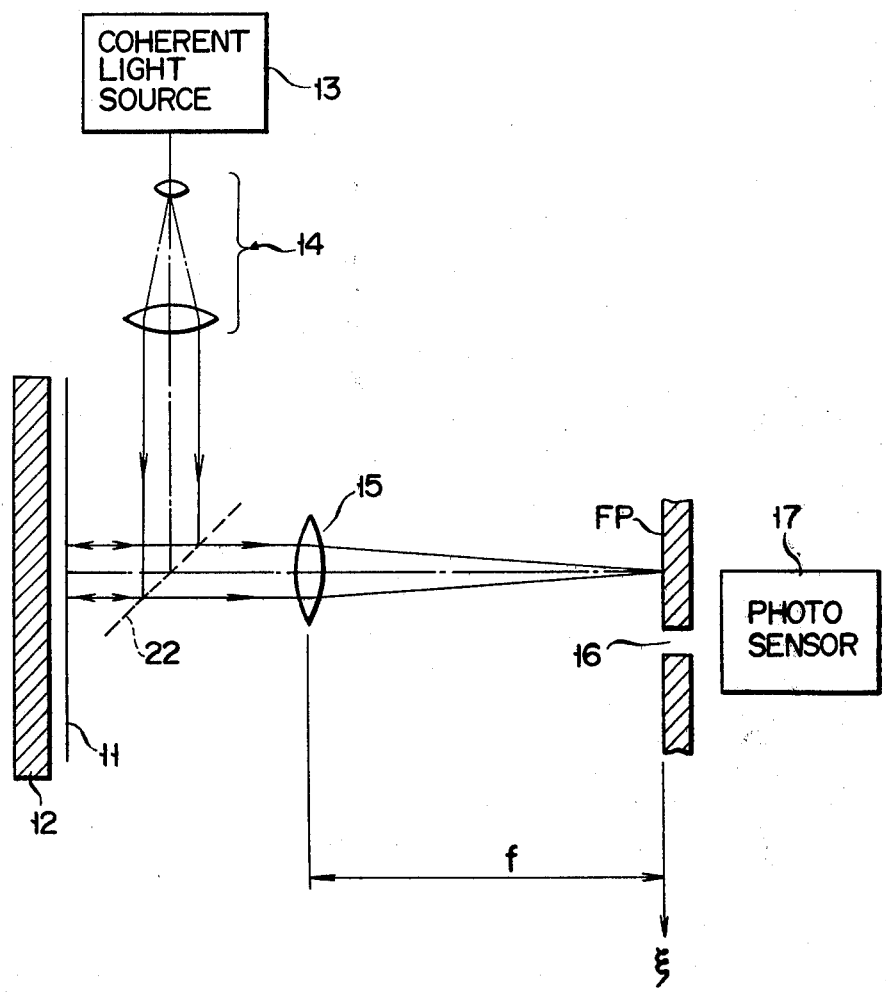

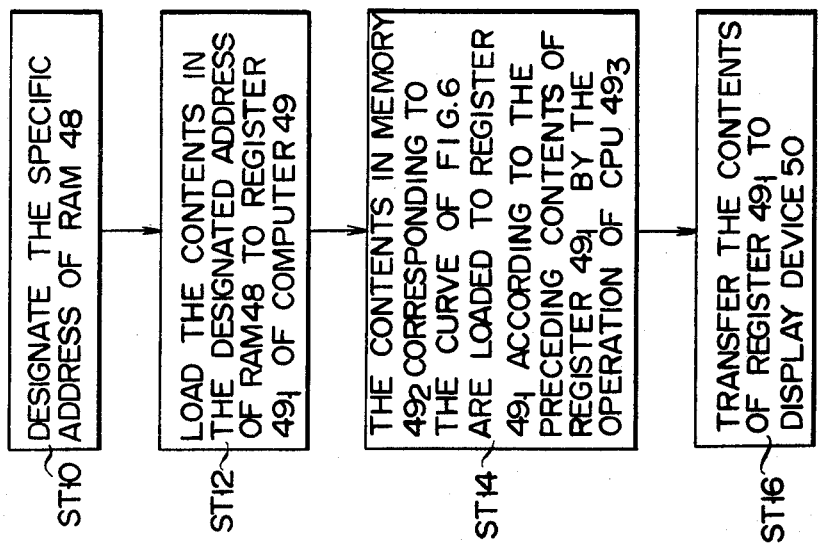
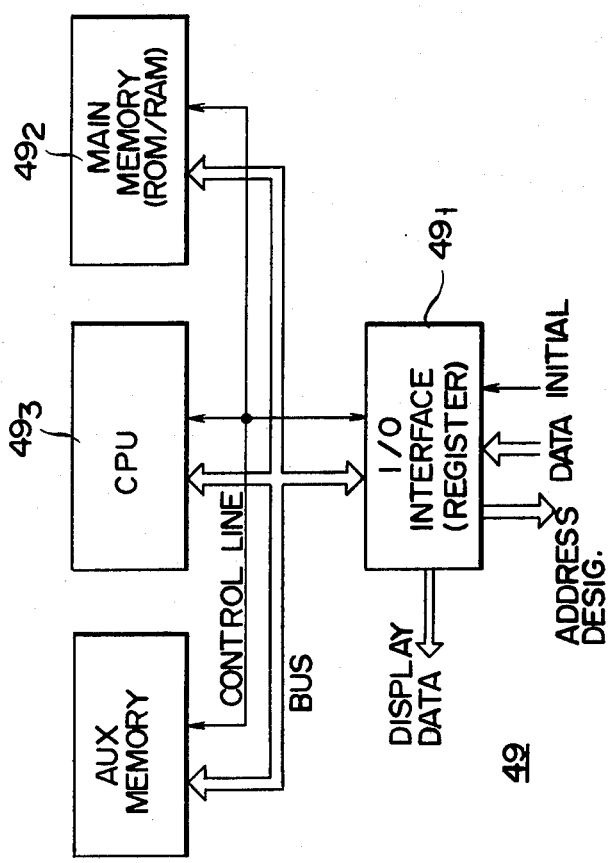

X-Y COLOR DISPLAY

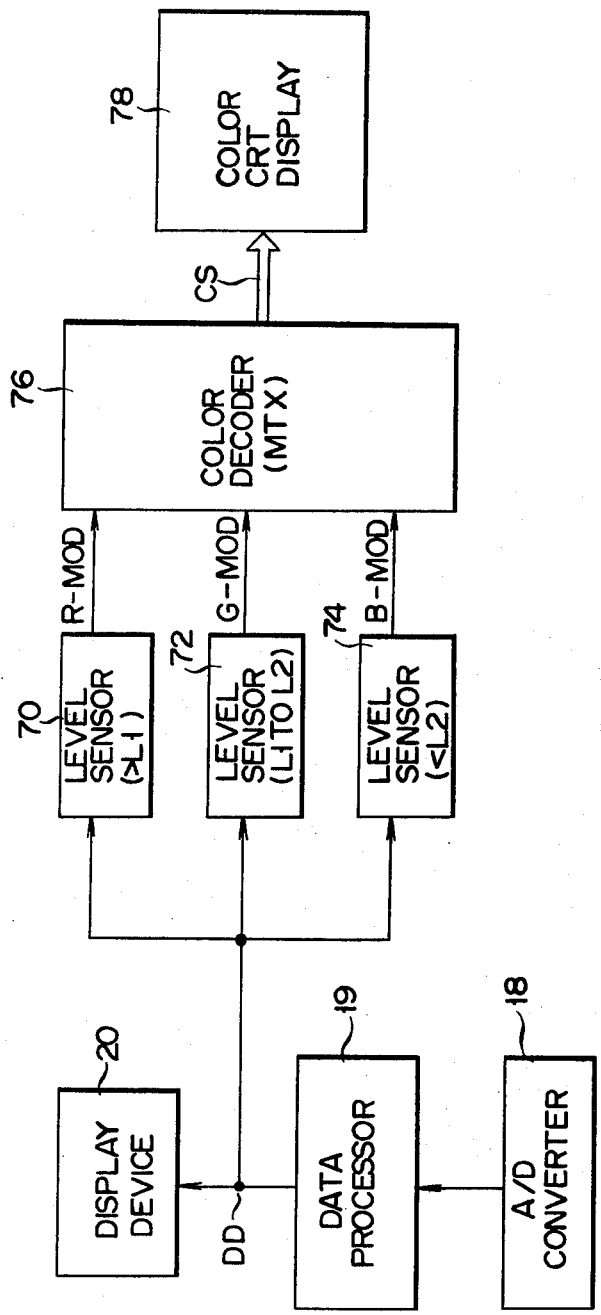

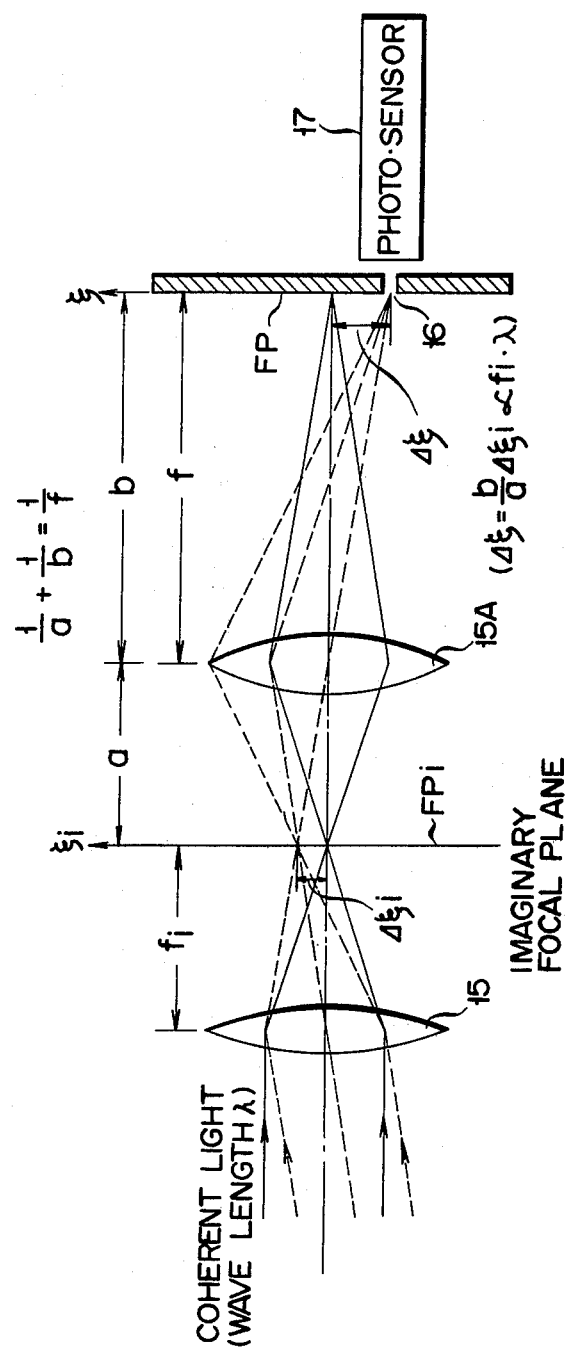

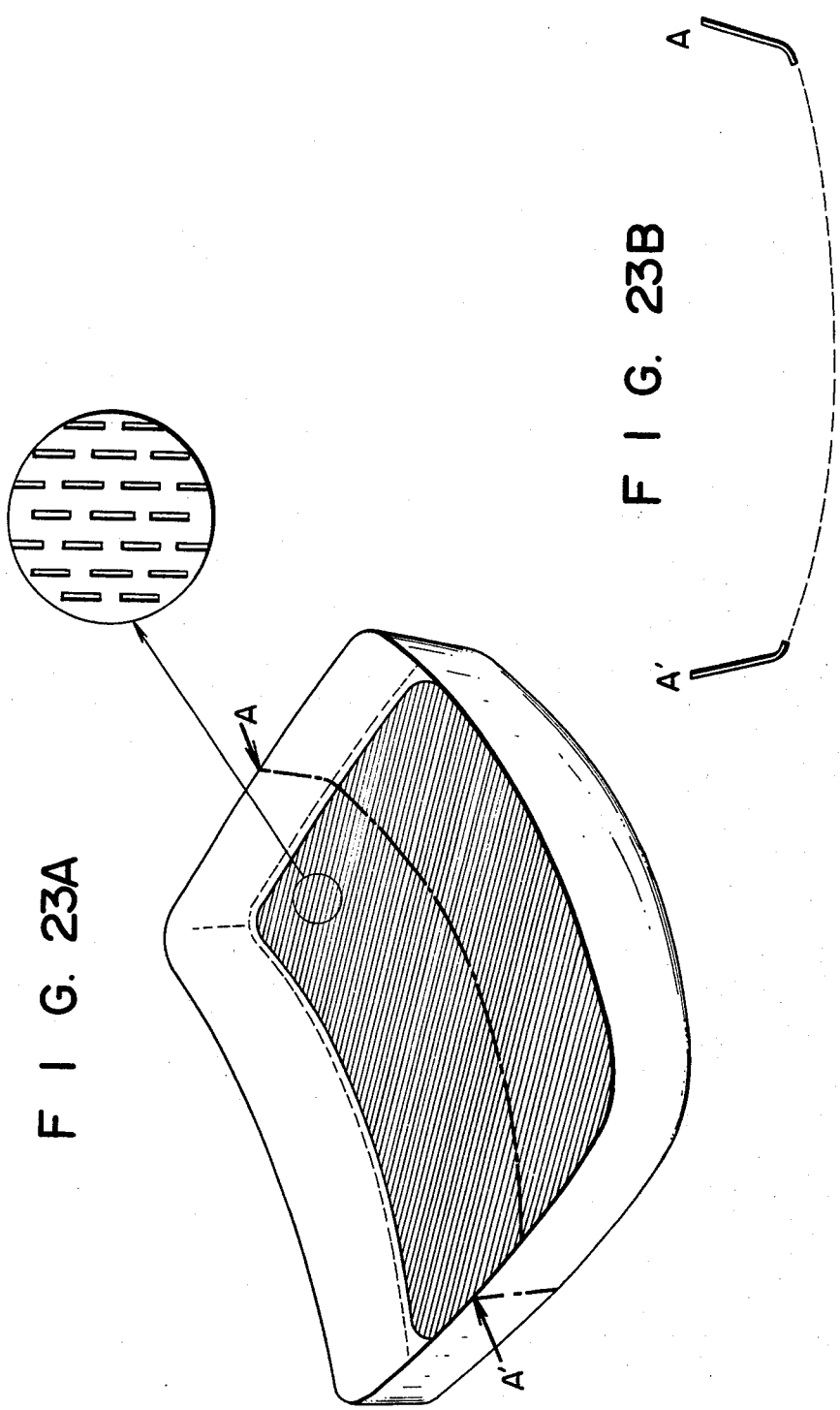

APPARATUS FOR INSPECTING AVERAGE SIZE OF FUNDAMENTAL PATTERNS

This invention relates to pattern inspecting apparatus for measuring the average size of fundamental patterns substantially regularly arranged in a body or object to be inspected.

As the system for measuring the pattern size, those as shown in FIGS. 1 and 2 are previously known. The system shown in FIG. 1 is provided by Recognition Systems Inc., U.S.A., and called MAME system. In this system, a body 2 having an opening or aperture is illuminated by a laser or coherent light beam through a Fourier transform lens 1, and the Fourier spectrum of the body, obtained by illumination thereof through the lens, is detected by a photodiode array 3. The output of the diode array 3 is coupled through an A/D converter (interface) 4 to a microcomputer 5. In the microcomputer 5, the input data which is a Fourier transform pattern image data is processed to obtain its autocorrelation distribution. From this autocorrelation distribution the opening or aperture size of the body 2 can be determined with high precision.

The system shown in FIG. 2 is for precisely measuring the diameter of a circular opening or aperture. In this system, an inspection pattern 6, obtained by laser beam irradiation, is coupled through a Fourier transform lens 7 to a filter 8 disposed on the Fourier transform conversion plane, and the filter output is coupled through another Fourier transform lens 9 for photoelectric measurement on an output plane 10 to determine the aperture diameter (A. L. Flamholz et al, IBM, J. Res. Develop. 1973, p. 509).

With the above measuring systems the size of a single aperture (or pattern) can be measured with high precision. However, if it is desired to obtain the average size of a number of patterns formed in a body to be inspected, considerable time is required for the measurement, because the sizes of the individual patterns have to be measured one after another before calculation of the average value.

As a prior art method for measuring the average size of a number of openings or apertures provided on a body for inspection, it has been known to measure light transmittance for obtaining the average aperture size through calculation. However, although this method is simple, precision of measurement is inferior.

The invention is intended in the light of the above, and its object is to provide an apparatus for inspecting average size of fundamental patterns at high speed and with high precision.

To achieve the above object of the invention, there is provided an apparatus for inspecting an object, which comprises Fourier transform means for producing output data corresponding to a Fourier transform pattern image of a given region of an object having regularly arranged fundamental patterns, extractor means coupled to the Fourier transform means, for extracting specific data representing a spatial frequency component of the order n from the output data, the magnitude of the order n component changing with the size variation of the fundamental patterns, data processor means coupled to the extractor means, for determining the average size of the fundamental patterns according to the specific data and providing an actual pattern size information indicating the average size of fundamental patterns.

The invention is predicated on the fact that with a Fourier transform pattern image of an object having regularly arranged fundamental patterns the light intensity distribution of the spatial frequency components or diffracted light components (which is hereinafter referred to as an envelope pattern) changes with the size of the fundamental patterns.

This will now be briefly discussed with reference to FIGS. 3A, 3B and 3C. FIG. 3A shows the Fourier spectrum of an object having regularly arrayed fundamental patterns. In the figure, the ordinate is taken for the light intensity, and the abscissa is taken for the spatial frequency (i.e., diffraction order). The peaks of the light intensity are referred to as diffraction components of order n (n being 0, 1, 2, . . .), and the envelope pattern for the individual peaks is designated as 100. Similar to FIG. 3A, FIGS. 3B and 3C also show envelope patterns of objects having regularly arrayed fundamental patterns. More particularly, FIG. 3B shows a Fourier spectrum in case where the fundamental patterns are slightly greater in size compared to the case of FIG. 3A, and FIG. 3C shows a Fourier spectrum in case where the fundamental pattern size is slightly less. In FIGS. 3B and 3C, the respective envelope patterns are designated as 101 and 102. In the envelope pattern 101 a slope sign change point (minimum level point) A2 is closer to the origin 0 than the corresponding slope sign change point A1 in the envelope pattern 101. (This is referred to as reduction.) In the envelope pattern 102 a slope sign change point A3 is further apart from the origin 0 than the point A1 in the envelope pattern 100. (This is referred to as enlargement.) It will be seen that since the envelope pattern changes depending upon the fundamental pattern size, light intensity information which changes even with very slight changes of the fundamental pattern size can be obtained from the measurement of the light intensity of diffraction component of a specific order in the neighborhood of the slope sign change point (i.e., extreme level point). For example, in FIGS. 3A to 3C, the intensity of a spectral component 200 is reduced with an enlargement of the fundamental pattern size and increased with a reduction of the fundamental pattern size. As for an another spectral component 201, the light intensity is increased with increase of the fundamental pattern size and reduced with decrease of the fundamental pattern size.

Thus, even slight changes of the fundamental patterns can be detected with high precision through the measurement of the higher order spectrum light intensity. In this case, even by expanding the measurement region for simultaneously obtaining Fourier transform data for a number of fundamental patterns on the inspected object, the obtained envelope pattern has a similar Fourier spectrum to that of the envelope pattern in case of a single fundamental pattern. Thus, it is possible to obtain instant measurement of the average size of all the fundamental patterns contained in the measurement region.

This invention can be more fully understood from the following detailed description when taken in conjunction with the accompanying drawings, in which:

FIG. 4 is a schematic diagram representing an embodiment of the invention;

FIGS. 11 and 12 show modifications of patterns shown in FIG. 5;

FIG. 13 shows a modification of FIG. 4 apparatus;

FIG. 18 illustrates details of the microcomputer 49 shown in FIG. 14;

FIG. 19 is a flow chart explaining the operation of microcomputer 49 of FIG. 14;

FIG. 21 is a block diagram of a configuration for displaying variation of patterns by means of X-Y color display;

FIG. 22 shows a partial modification of the apparatus of FIG. 4;

FIG. 23A shows another example pattern to be inspected in accordance with the present invention, where apertures are located on a 3-dimensionally formed surface; and FIG. 23B shows a cross-sectional view taken along lines A—A' of FIG. 23A.

Figure 1:
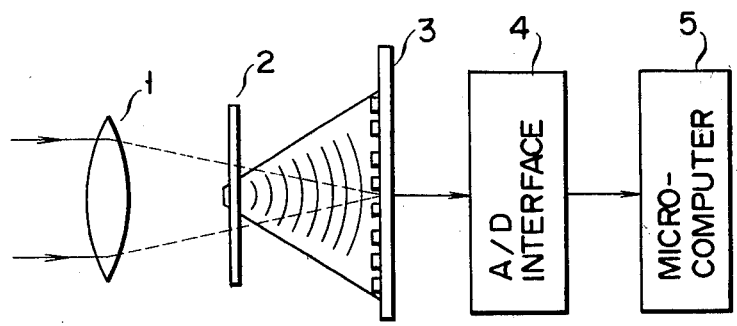
FIGS. 1 and 2 show prior art apparatuses for measuring or inspecting pattern sizes.
Figure 2:
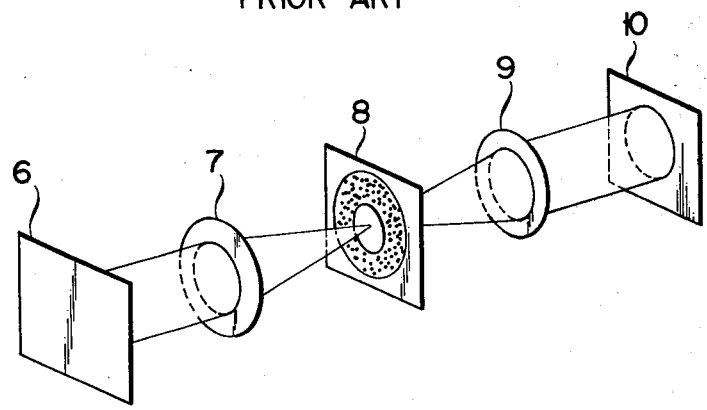
Figure 3A:
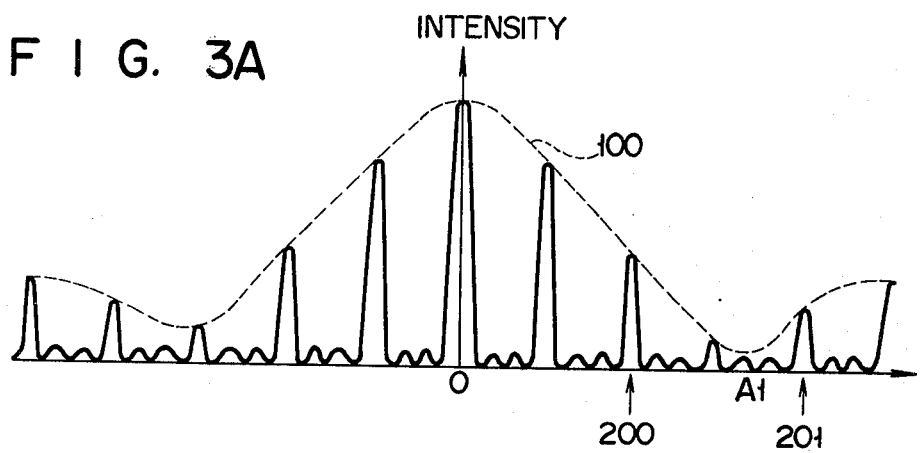
FIGS. 3A, 3B and 3C are graphs explaining the nature of the present invention.
Figure 3B:
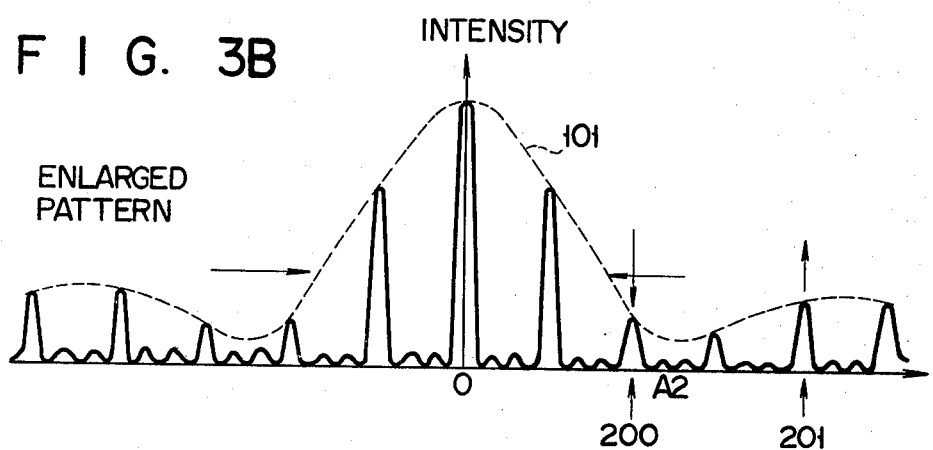
Figure 3C:
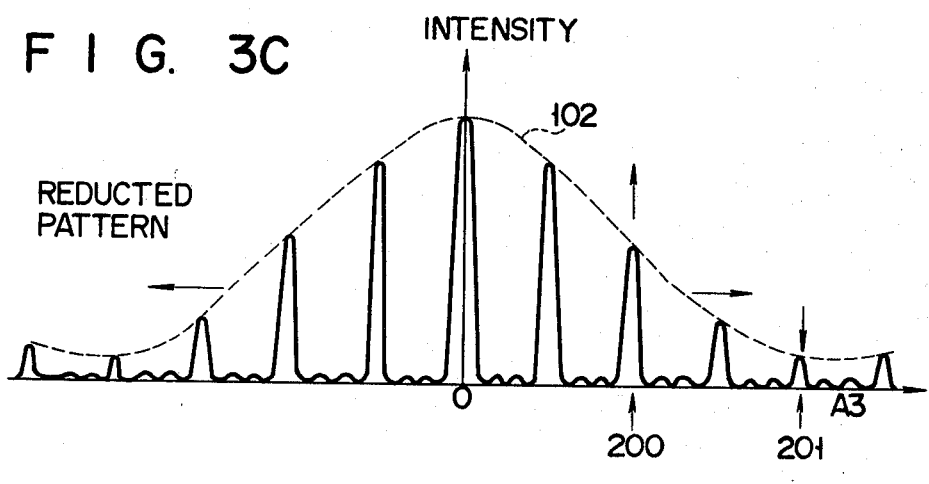

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art. An embodiment of the pattern inspection apparatus according to the invention will be described.

FIG. 4 shows a schematic diagram of the embodiment of the invention. An object 11 to be inspected is supported in an X-Y stage 12. (The X-Y stage 12 will be described hereinafter in detail with reference to FIG. 15.) The object 11 which is inspected in accordance with the invention is a plate formed with a number of regularly arrayed openings or apertures as will be described in connection with FIG. 5 and following figures. A coherent light source 13 which may, for instance, be a helium-neon laser, produces a coherent light beam, which is enlarged by a collimator lens system 14 to an appropriate light spot diameter, for instance 8 mm. The enlarged parallel coherent light beam irradiates a given region of the object 11. Light transmitted through the object 11 is incident on a lens 15. The lens 15 has a Fourier transform function, and a Fourier transform conversion pattern image of the object 11 is formed on a focal plane FP which is located at a position distant from the lens 15 by the focal distance f thereof. An opening or pinhole 16 is provided on the focal plane FP, and of the aforementioned Fourier transform conversion pattern image only the diffracted light of the order n passes through the pinhole 16. The order n diffracted light passing through the pinhole 16 is incident on a photosensor 17, for instance a photomultiplier, and converted thereby into an electric signal $I_n$ (specific data), which is converted by an A/D converter 18 into a digital signal $I_D$ which is in turn coupled to a data processor 19. The result of data processing in the data processor 19 is displayed on a display device 20 which comprises, for instance, a CRT monitor. Designated at 21 is a stage controller for driving the X-Y stage 12.

Figure 5:
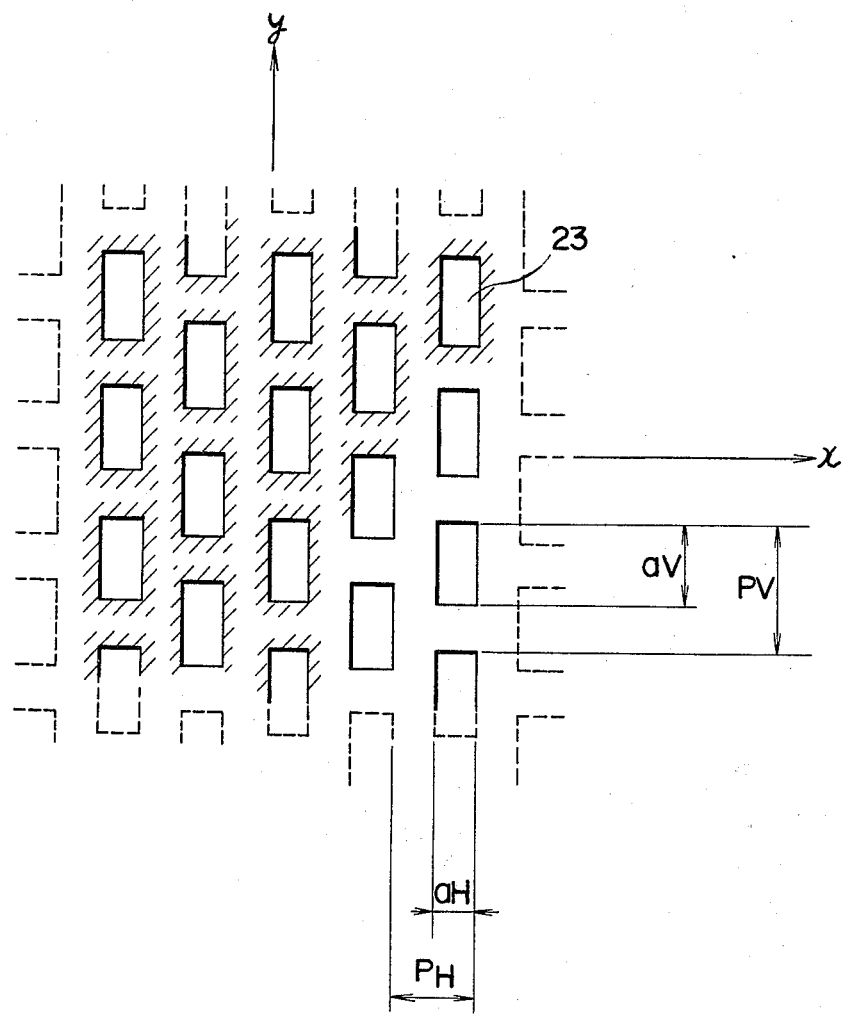
FIG. 5 shows example patterns located in a given region of a body to be inspected.

FIG. 5 shows an example of the object inspected. This object is a color television picture tube shadow mask comprising a base plate formed with a number of rectangular openings 23. The size of the openings 23 is $a_H$ in X-axis direction and $a_V$ in Y-axis direction. These openings are regularly arranged at a pitch $P_H$ in X-axis direction and a pitch $P_V$ in the Y-axis direction.

The Fourier transform pattern for such inspection object is given as (sinc pattern)×(Fourier pattern of aperture arrangement) . . . (1) Note:

$$\text{sinc } x = \frac{\sin \pi x}{\pi x}$$

Now, the case of measuring the average value of the X-axis dimension $a_H$ of the apertures in the object will be described (the case with the Y-axis dimension $a_V$ being the same as the case with the X-axis dimension and thus not described).

The object 11 is supported in the manner as shown in FIG. 4, with the X-axis direction coincident with the vertical direction of the paper of the figure and the Y-axis direction coincident with a direction perpendicular to the paper thereof, and the pinhole 16 is located in the focal plane FP at which the order n diffracted light on the spatial frequency axis ($\xi$ axis) in the X-axis direction is focused. In this arrangement, when there is a variation $\Delta a_H$ in the size $a_H$, the electric signal $I_n$ produced from the photoelectric converter 17 is given as $$I_n(\Delta a_H) \propto \frac{1}{n^2} \sin^2\left(n\pi \frac{a_H + \Delta a_H}{P_H}\right) \quad (2)$$

Thus, measurement of the variation $\Delta a_H$ through amplification is possible by appropriately selecting the number n and also appropriately settling the argument value of $\sin^2$, i.e., selecting an appropriate working point for the measurement.

Figure 6:
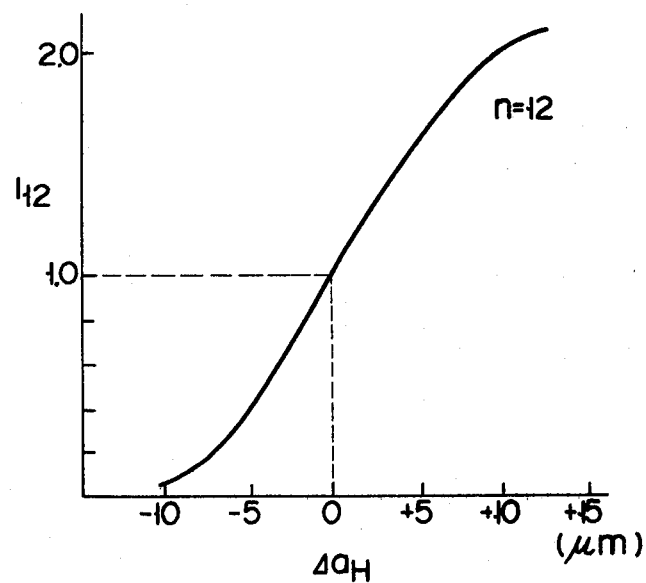
FIGS. 6 and 7 are graphs illustrating the relation between intensity ($I_n$) of the specific diffracted light component and variation ($\Delta a_H$) of the pattern size.
Figure 7:
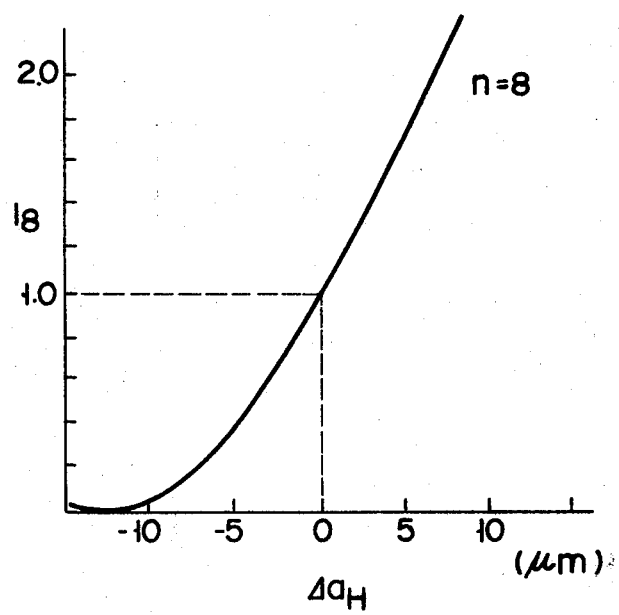

FIGS. 6 and 7 shows the relation between electric signal $I_n$ and variation $\Delta a_H$. The electric signal is unity for the object (FIG. 5) where $a_H = 170$ μm and $P_H = 650$ μm.

FIG. 6 shows the electric signal $I_{12}$ in case with n=12, i.e., in case where the order 12 diffracted light is extracted through the pinhole 16. In this case ±1 μm variation of $a_H$ can be detected as ±12% changes of the electric signal.

FIG. 7 shows the electric signal $I_8$ in case with n=8, i.e., in case where the order 8 diffracted light is extracted through the pinhole 16. In the actual measurement, the order number n can be appropriately selected by taking the measurement conditions, characteristic curve of the electric signal, detection sensitivity, signalto-noise ratio, etc. into considerations. With the inspection object as mentioned above, about 120 apertures can be simultaneously illuminated by a parallel light beam of 8 mm in diameter.

For obtaining the average value of the aperture size $a_Y$ of the object in the Y-axis direction shown in FIG. 5, the pinhole 16 in FIG. 4 may be located such that it permits extraction of the order n diffracted light in the $\eta$-axis perpendicular to the $\xi$-axis (i.e., in a direction perpendicular to the paper of the figure).

Figure 8:
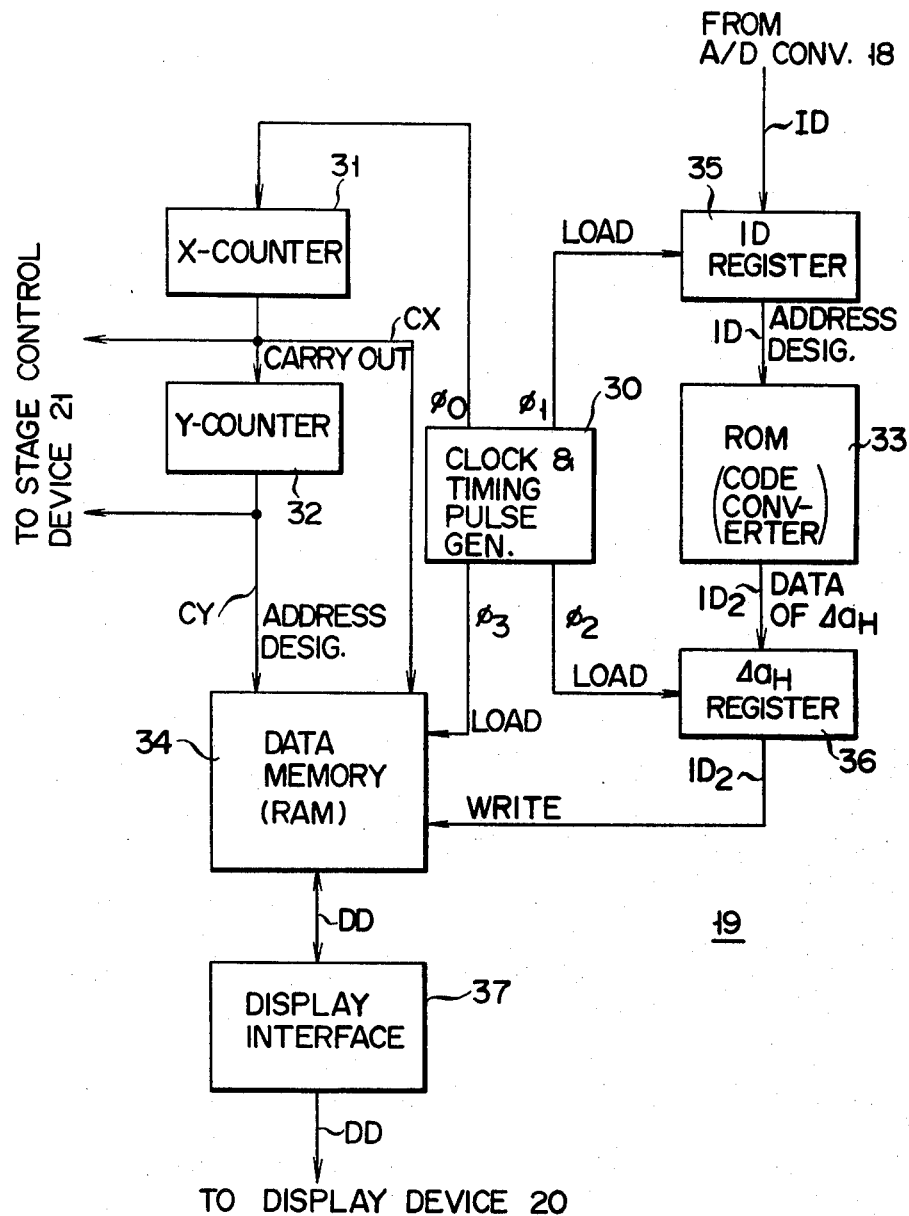
FIG. 8 is a block diagram illustrating specific details of the data processor 19 shown in FIG. 4.

FIG. 8 shows specific details of the data processor 19 shown in FIG. 4. An X-counter 31 and a Y-counter 32 count output pulses from a clock & timing pulse generator 30, and their outputs, produced as a result of counting, indicate the region of the object 11 that is illuminated by the parallel light beam. A code converter (ROM) 33 in which the digital data corresponding to the characteristic curve shown in FIG. 6, for instance, is memorized. A data memory (RAM) 34 stores the measured or calculated average pattern size in each region. When the X-counter 31 receives a pulse $\phi 0$ supplied from the clock & timing pulse generator 30, it adds "1" as increment to its count. The count result data of the X- and Y-counters 31 and 32 are supplied to the stage control device 21. The stage control device 21 moves the X-Y stage 12 in the X- and/or Y-directions according to the count result data inputted. At this time, a Fourier transform pattern image of the region of the object 11 irradiated by the parallel light beam is formed through the lens 15, and its order 12 diffracted light is extracted through the pinhole 16. The photosensor 17 thus produces an electric signal $I_{12}$ corresponding to the intensity of the extracted order 12 diffracted light. The electric signal $I_{12}$ is converted by the A/D converter 18 into the digital data $I_D$. This data $I_D$ is loaded in a register 35 under the control of a pulse $\phi 1$ produced from the clock & timing pulse generator 30. The data $I_D$ in the register 35 is supplied as an address designation signal to the ROM 33, whereby data $I_{D2}$ representing the average variation value $\Delta a_H$ corresponding to the data $I_D$ is read out from the ROM 33. This data $I_{D2}$ is loaded in a register 36 under the control of a pulse $\phi 2$ produced from the clock & timing pulse generator 30. When the clock & timing pulse generator 30 subsequently produces a pulse $\phi 3$, the data $I_{D2}$ representing $\Delta a_H$, loaded in the register 36, is written in the data memory 34 in specific address thereof designated by the contents CX and CY of the X- and Y-counters 31 and 32.

As the clock & timing signal generator 30 repeatedly produces the successive pulses $\phi 0$ to $\phi 3$, the scanning or measuring of the entire area of the object 11 is obtained, and the average variation values for individual regions are successively stored in the data memory 34. The content DD of the data memory 34 is taken out through a display interface 37 for display on the display device 20.

Figure 9:
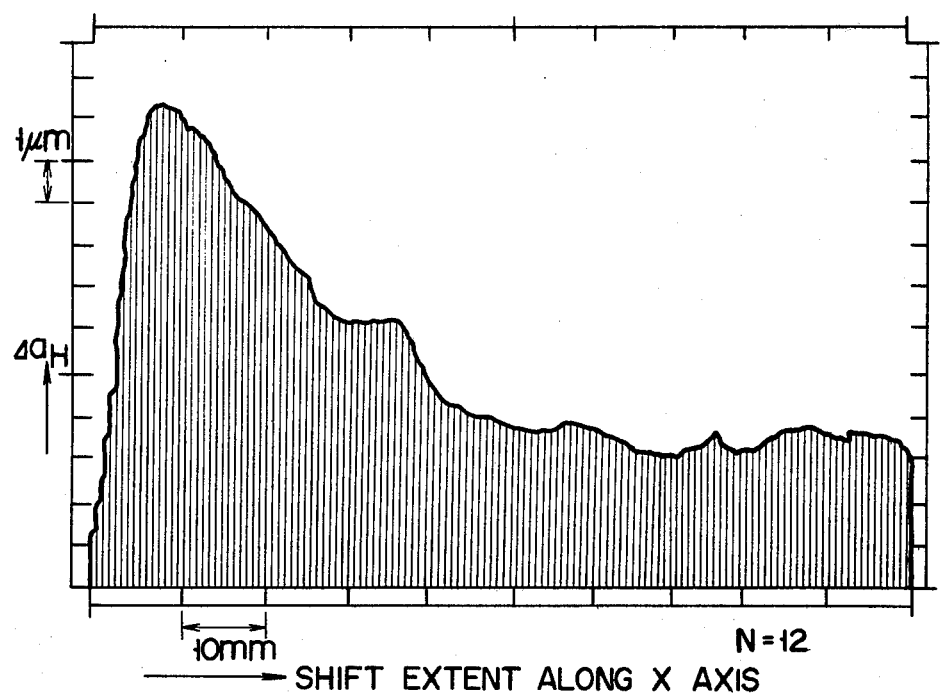
FIG. 9 shows an example of displayed figure illustrating $\Delta a_H$ vs. X.

FIG. 9 shows an example of the display on the display device 20. In the Figure, the ordinate is taken for the average variation $\Delta a_H$ and graduated in $\mu$m, and the abscissa is taken for the shift extent of the X-Y stage 12 in the X-direction and graduated in 10 mm. While the instant embodiment is constructed such that it permits observation of the object pattern size variations in the X-axis direction, it is also possible to obtain a two-dimensional display of fluctuations of the pattern distribution over the entire inspection object by setting up one-to-one correspondence between the points on a CRT display, for instance, and the points on each region of the object 11 and showing the average variations $\Delta a_H$ for the individual regions with corresponding colors. Such a color display can be realized by modulating a color television color decoder with a signal corresponding to $\Delta a_H$, and this will be described hereinafter in detail.

Now, the effects of the invention will be discussed.

In one embodiment of the invention, use is made of the Fourier transform function of a lens for inspecting all the pattern information contained in the coherent light beam transmitted through an object inspected. The Fourier transform has such a nature as to permit instant measurement of the average size of all pattern information contained in the transmitted beam. Thus, according to the invention the speed of measurement obtainable is by far higher than the case of a prior art high precision measuring instrument such as a computer image processing system where the individual patterns are measured one after another for calculating the average pattern size. With the above embodiment of the present invention, about 120 patterns contained in a 8-mm diameter laser beam can be instantly measured with a resolution of 0.1 $\mu$m. If the same resolution is to be provided for data processing with a computer processing system, as large a bit number as about $5 \times 10^9$ bits is required for the aforementioned 8-mm diameter input data. In this case, some 5 seconds is required for the measurement with a processing rate of 1 nsec. per bit.

In the second place, the precision obtainable according to the invention is by far superior to the prior art light transmittance measuring method, which is a high speed measuring method. With the usual case of light transmittance measurement, the variation of the light transmittance that is obtainable with a $\pm 1$ $\mu$m variation of the $a_H$ of the object inspected with the above embodiment is only about $\pm 0.57\%$. In contrast, according to the invention the order 12 diffracted light intensity ($I_{12}$) is varied by as much as 12% with the $\pm 1$ $\mu$m as in the above embodiment. This means that according to the invention it is possible to obtain as high a sensitivity as about 20 times that in the case of the prior art light transmittance method.

Figures 10A, 10B, 10C:
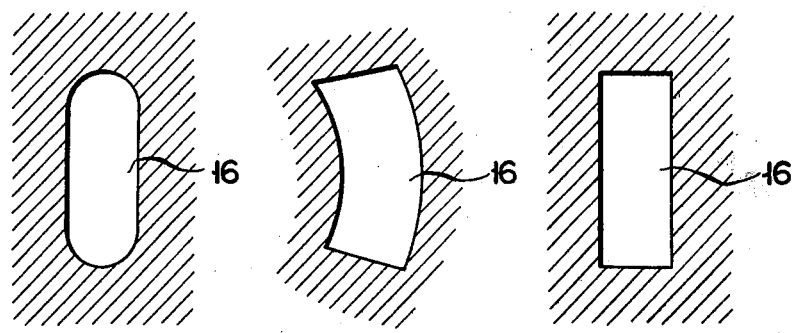
FIGS. 10A, 10B and 10C show modifications of pinhole 16 provided on the focal plane FP.

Further, with the apparatus according to the invention, accurate measurement can be obtained even where the object inspected is subject to rotation by several degrees. More particularly, the pattern that is formed on the focal plane of the Fourier transform lens has an arrangement of bright spots widely spaced apart from one another. Accordingly, by forming the pinhole 16 such that it is elongate in the direction of rotation of the object, as shown in FIGS. 10A to 10C, to such an extent that the diffracted light (i.e., a bright spot) can be detected without extraction of the diffracted light of the adjacent order (i.e., order (n−1)th and (n+1)th with respect to the order n), correct measurement can be obtained even if the object 11 inspected is subject to rotation within, for instance, about 15° in case with the order 12 diffracted light for detection and about ±7° in case with the order 8 diffracted light.

In addition, with the apparatus according to the invention the measurement is determined by the $a_H/P_H$ as is seen from formula (2). Thus, tilting of the inspected object with respect to the optical axis does not affect precision of measurement because this does not result in a change of $a_H/P_H$. This further means that correct pattern size measurement can be obtained even in case where the object 11 is three-dimensionally deformed; that is, accurate pattern size measurement can be obtained in case of an object 11 as shown in FIGS. 23A and 23B, which is prepared from a flat plate with a press.

Further, it will be apparent from the principles of measurement that even if the inspection object is shifted in the X- and Y-directions instant measurement of the region irradiated by a beam can be obtained. This means that no positioning adjustment of the object is needed, and measurement can be made while moving the object.

Further, by using a parallel light beam for illumination, accurate measurement can be obtained even in case when the object is displaced in the direction of the beam axis, that is, no focusing is needed. Thus, with an object having a shape as shown in FIGS. 23A and 23B, no particular focusing mechanism is needed for the measurement.

Rearranging formula (2) we obtain $$S_n(\Delta x) = \sin^2\left(n\pi \frac{a_H + \Delta x}{P_H}\right) / \sin^2\left(n\pi \frac{a_H}{P_H}\right) - 1 \tag{3}$$

Equation (3) defines the sensitivity $S_n(a_H)$ of the apparatus with respect to $a_H$ vs. $I_n$. $S_n$ is a function of n expressed as $$S_n(a_H) = 2 \cot\left(n \frac{\pi a_H}{P_H}\right) \tag{4}$$

It will be seen that n can be appropriately determined to provide a high sensitivity when $a_H/P_H$ is given by equation (4). In practice the order n to be extracted should be determined with measuring condition, such as a measuring range.

As has been shown, according to the invention it is possible to provide a practical measuring apparatus, with which the precision requirement is less strict in spite of the fact that high speed and high precision measurement is possible.

Now, some modifications of the above embodiment of the invention will be described. While in the above embodiment the object for inspection has had regularly arrayed rectangular apertures as shown in FIG. 5, this is by no means limitative, and an object having fundamental patterns of any shape, such as oval apertures as shown in FIG. 11 or circular apertures as shown in FIG. 12, can be inspected insofar as the patterns are substantially regularly arrayed. With the inspection objects shown in FIGS. 11 and 12, however, formulas (1) to (4) do not be held. Accordingly, with these objects a slope sign change point (minimal or maximal level point) in the envelope pattern of the Fourier transform pattern image which bears the information about the individual fundamental patterns may be found out, and diffracted light of order n in the neighborhood of that point with much intensity (i.e., amplitude) variation may be selected for measurement. Stated differently, the invention selects the order n spatial frequency component where the rate of change, i.e. the differential coefficient, of the magnitude of the order n component with respect to the variation of the size of the patterns is substantially maximum; preferably this order n spatial frequency component occurs where the envelope of the spatial frequency components is at a minimum level. By so doing, high sensitivity measurement can be obtained.

In another aspect, while in the above embodiment the object for inspection has had openings or apertures formed in a substrate typically such as a shadow mask for television picture tube screen, the invention is also applicable to the inspection of objects without any aperture such as a glass plate provided with fundamental patterns of an opaque material or a material having a different light transmittance. Further, in case of a light reflecting object such as metal object which is provided with fundamental patterns, an arrangement as shown in FIG. 13 may be employed for measurement. In this arrangement, a Fourier transform pattern image is formed from light reflected by an object 11. More particularly, in FIG. 13, parallel light transmitted through a half mirror 22 is incident on the object 11, and light reflected thereby is coupled through the half mirror 22 to a lens 15, which has the Fourier transform function. The other part of the construction is the same as in the apparatus of FIG. 4, so its description is omitted.

In the arrangement of FIG. 4, the extraction of order n diffracted light on the focal plane can be made more easy when patterns of an object are spaced apart with a large pitch by means of disposing, in the light path, a lens 15 for enlarging the Fourier transform pattern image.

Also, it is possible to dispose a light screening tube and a color filter in front of the pinhole 16 in order to eliminate undesired external noise light being irrelevant to the measurement. Further, a microcomputer may be used for the data processor 19. In this case, it is possible to provide not the relative value (i.e., variation) but the absolute value of the fundamental pattern average size by using an one-to-one correspondence table between the photosensor output and output data.

Figure 14:
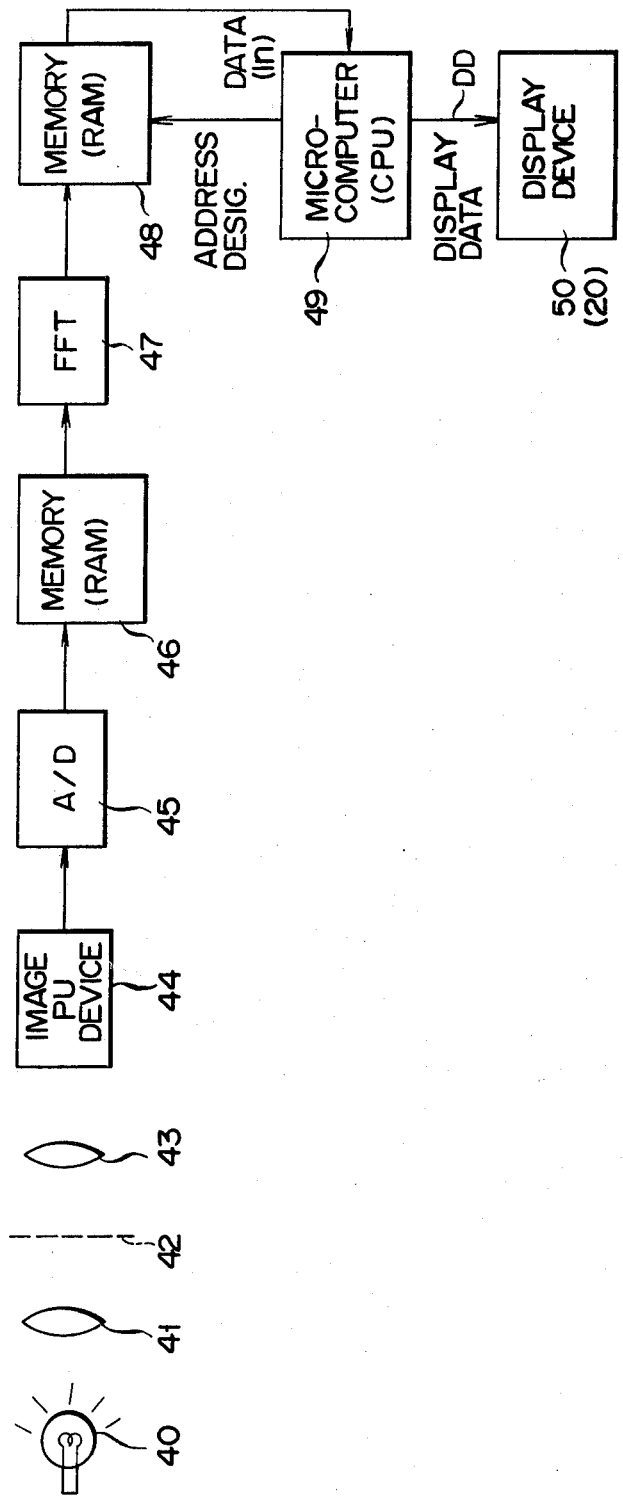
FIG. 14 is a schematic diagram representing another embodiment of the invention.

FIG. 14 shows a different embodiment of the invention.

In this embodiment, the Fourier transform pattern image is electrically formed. In the figure, light from an incandescent lamp 40 illuminates an object 42 to be inspected through a lens 41. The light image of a given region of the object 42 is focused through a lens 43 on a target plane of an image pick-up device 44, for instance a vidicon ®. The image pick-up device 44 converts the incident light image into an electric signal, which is converted through an A/D converter 45 into a digital signal to be stored in a read/write memory 46. The image data output from the memory 46 is coupled to a fast Fourier transform unit 47, the output of which is coupled to and stored in a read/write memory 48. Thus, in the memory 48 digital data of the two-dimensional Fourier transform pattern image of a given region is stored. As the Fourier transform unit 47, Model AP-400, by Analogic Inc., U.S.A., for instance, may be used.

In the microcomputer 49, an address corresponding to a diffracted light component of a suitable order is preset, and the content of the memory 48 for this address is selectively fetched out for arithmetic processing in the microcomputer 49. As a result of processing, the average size of a plurality of fundamental patterns contained in the given region of the object 42 is obtained, and this result is displayed on a display device 50.

This embodiment is suitable for the inspection or measurement of an object, in which fundamental patterns are formed in, e.g. an optically non-uniform glass plate. For example, in case of an inspection of a glass substrate which is not uniform in thickness, with the optical Fourier transform system as shown in FIG. 4, the Fourier transform pattern image being obtained also contains information relating to the thickness irregularities, that is, a Fourier transform pattern image concerning the thickness irregularities is superimposed upon the Fourier transform pattern image concerning the fundamental pattern size. With this embodiment, such a phenomenon can be eliminated, and it is possible to ensure high precision of measurement. Also, it is possible to obtain measurement free from the influence of any contamination of the inspected object, for instance a fingerprint sticking on the surface of the object.

Figure 15:
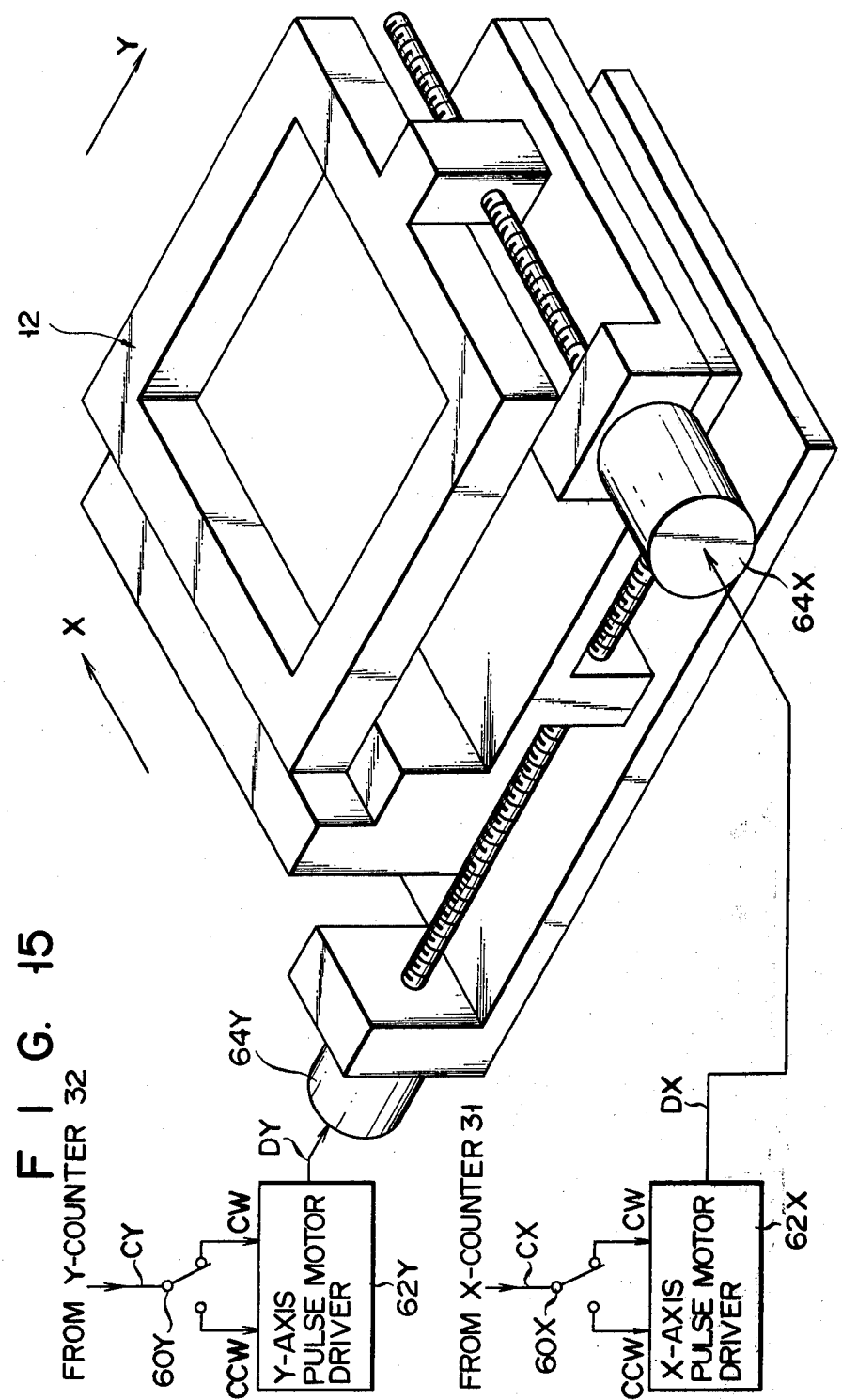
FIG. 15 shows a view of X-Y stage used in the embodiments of FIGS. 4 and 13.

FIG. 15 shows a specific example of the X-Y stage 12 shown in FIG. 4 or 13. Referring to the Figure, the count output CY produced from the Y-counter 32 in FIG. 8 is coupled through a shift direction change switch 60Y to a conventional Y-axis pulse motor driver 62Y. Similarly, the count output CX produced from the X-counter 31 is coupled through a similar switch 60X to an X-axis pulse motor driver 62X. A drive output DY from the driver 62Y is coupled to a Y-axis pulse motor 64Y for shifting the stage 12 in the Y-axis direction. Similarly, a drive output DX from the driver 62X is coupled to an X-axis pulse motor 64X. The motors 64Y and 64X are rotated, for instance in the clockwise direction, according to the data CY and CX coupled to the respective drivers 62Y and 62X. The motor 64X shifts the stage 12 in the X-axis direction by a distance corresponding to the count value of the X-counter 31 or data CX. Every time the shift by the whole stroke in the X-axis direction is made, the output DY is incremented, and the stage 12 is shifted a predetermined amount in the Y-axis direction in accordance with the increment of the output DY.

Figure 16:
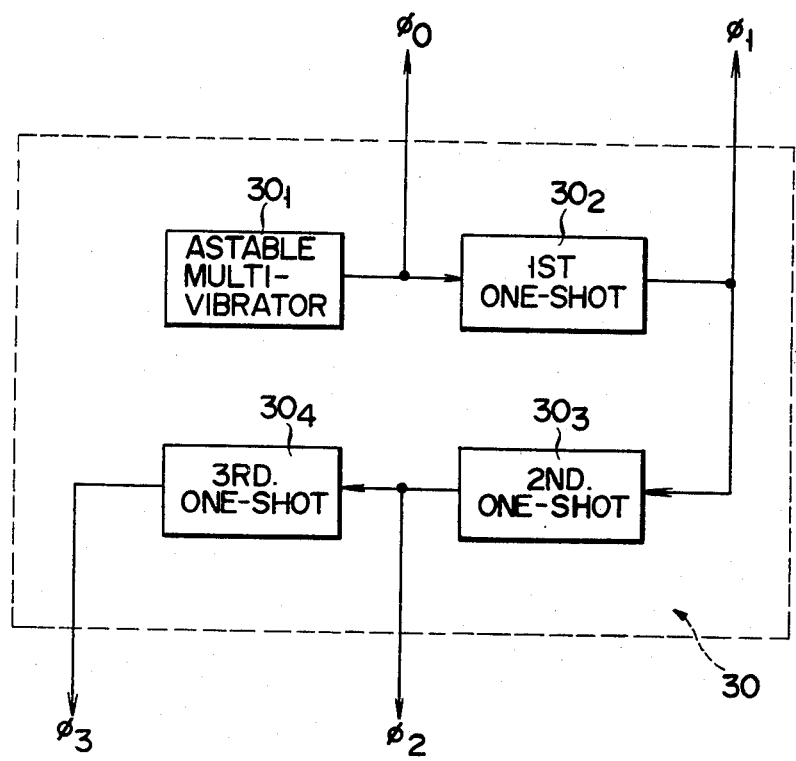
FIG. 16 is a block diagram illustrating specific details of the pulse generator 30 shown in FIG. 8.
Figure 17:
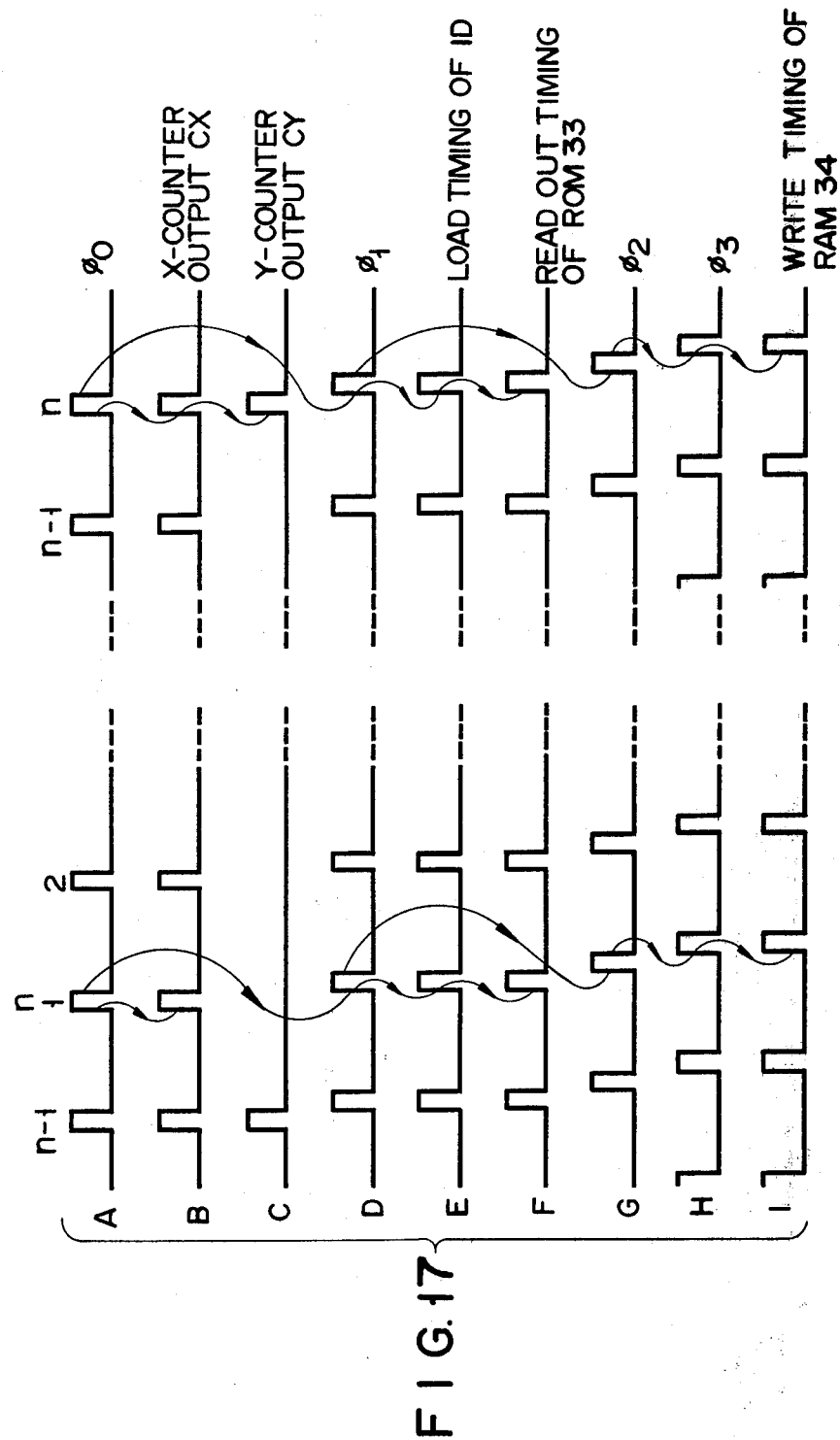
FIG. 17 is a timing chart illustrating the operation sequence of the pulse generator 30.

FIG. 16 shows a specific example of the clock & timing pulse generator 30, and FIG. 17 is a timing chart illustrating the operation sequence of the generator 30. An astable multivibrator (AMV) $30_1$ produces a clock pulse signal $\phi_0$ as shown in A in FIG. 17. The pulse signal $\phi_0$ constitutes the count input to the X-counter 31, and it is also coupled to a first one-shot $30_2$. The one-shot $30_2$ is triggered by the trailing edge of the pulse $\phi_0$, and it produces a first load pulse signal $\phi_1$ as shown in D in FIG. 17. To simplify the construction, in FIG. 17, the counter 31 is defined as a modulo one counter (In this case the counter 31 may be omitted.). The loading of the data $I_D$ in the register 35 is effected under the control of the pulse signal $\phi_1$.

The pulse signal $\phi_1$ is also coupled to a second one-shot $30_3$. The second one-shot $30_3$ is triggered by the trailing edge of the pulse $\phi_1$, and it produces a second load pulse signal $\phi_2$ as shown in G in FIG. 17. The loading of the data $I_{D2}$ from the ROM 33 to the register 36 is effected under the control of the pulse signal $\phi_2$.

The pulse signal $\phi_2$ is also coupled to a third one-shot $30_4$. The one-shot $30_4$ is triggered by the trailing edge of the pulse $\phi_2$, and it produces a third load pulse signal $\phi_3$ as shown in H in FIG. 17. The loading of the data $I_{D2}$ form the register 36 to the RAM 34 is effected under the control of the pulse signal $\phi_3$.

The address of the RAM 34 for storing the data $I_{D2}$ is determined by the count outputs CX and CY. If the Y-counter 32 is a modulo n counter, one output pulse CY is produced every time n pulses $\phi_0$ are produced. For example, if the Y-counter 32 is a decimal counter and has produced 128 pulses $\phi_0$ from the outset, the data CY represents "12", and the data CX represents "8". In this case, the data $I_{D2}$ is stored in, e.g. the address No. 128 of the RAM 34.

FIG. 18 shows the internal construction of the microcomputer 49 shown in FIG. 14, and FIG. 19 is a flow chart illustrating the operation of the microcomputer 49. Referring to FIG. 18, a main memory (ROM/RAM) $49_2$ holds a data table of the In versus $\Delta a_H$ relation as shown in, for instance, FIG. 6. When making inspection of the order 12 diffracted light component, for instance, a CPU $49_3$ designates the specific address of the RAM 48 where a signal (specific data) $I_{12}$ is stored (step 10 of FIG. 19). Then, the contents in the designated address of the RAM 48 are loaded to a register $49_1$ (step 12). In consequence, the CPU $49_3$ searches the data table in the memory $49_2$ for variation data corresponding to the contents of the data $I_{12}$ loaded in the register $49_1$ and transfers variation data thus found out from the memory $49_2$ to the register $49_1$ (step 14). The contents thus loaded in the register $49_1$ (i.e., the variation data) are then transferred as display data to the display device 50 (step 16). As a result, the device 50 makes a two-dimensional display as shown in FIG. 9.

Figure 20A:
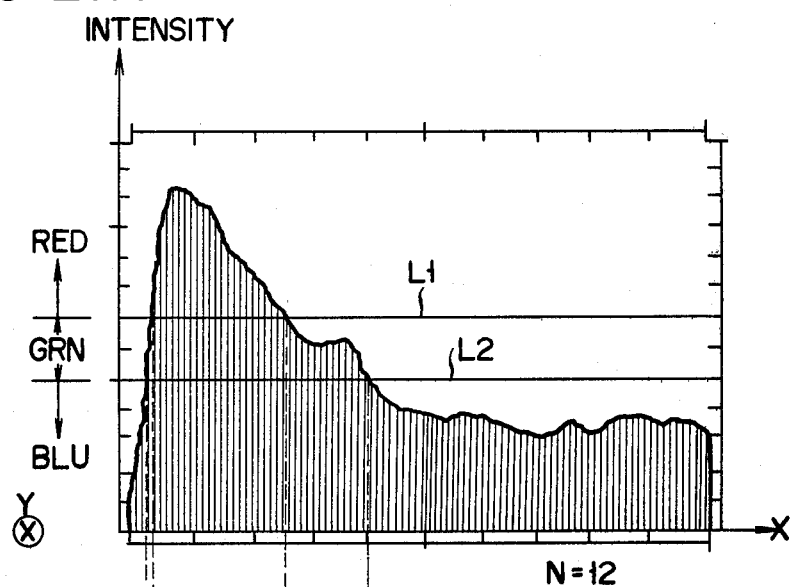
FIGS. 20A and 20B illustrate an example of X-Y color display indicating the variation ($\Delta a_H$) of patterns.
Figure 20B:
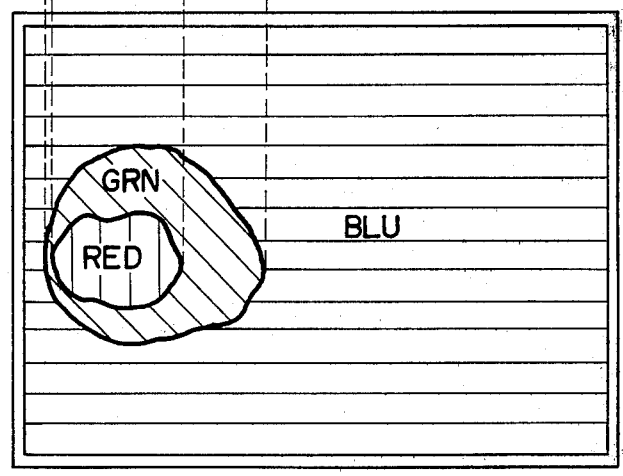

FIGS. 20A and 20B show the case of displaying the inspection patterns as two-dimensional color display. In this case, the intensity of, for instance, the order 12 diffracted light component is classified into three regions by two threshold levels $L_1$ and $L_2$. The levels $L_1$ and $L_2$ respectively correspond to the upper and lower limits of the nominal average pattern size. The region where the intensity level is above $L_1$, i.e., where the pattern size is greater than the nominal size, is displayed in red, for instance. The region of intensities between $L_1$ and $L_2$ where the pattern size is the nominal size is displayed in green, for instance, and the region of intensities less than $L_2$, i.e., of the pattern size less than the nominal size, is displayed in blue, for instance.

FIG. 21 shows an example of the system for the X-Y color display. The display data DD produced from the data processor 19 is coupled to the level sensors 70, 72 and 74. The sensor 70 is a high level comparator in which $L_1$ is set as its reference level. The sensor 74 is a low level comparator in which $L_2$ is set as its reference level. The sensor 72 is a level slicer with $L_1$ and $L_2$ as its reference levels. The sensors 70 to 74 may be constructed with a conventional operational amplifier.

When the intensity $I_n$ corresponds to $DD > L_1$, a red modulation signal is supplied from the sensor 70 to a color decoder 76. When $L_1 > DD > L_2$, a green modulation signal is supplied from the sensor 72 to the decoder 76. When $DD < L_2$, a blue modulation signal is supplied from the sensor 74 to the decoder 76. The decoder 76 may be constructed with, for instance, a conventional NTSC type color decoding matrix circuit. The decoder 76 color decodes its input and produces a color signal CS coupled to a conventional color CRT display device 78. With the color signal input to it, the device 78 makes the X-Y color display as shown in FIG. 20B.

FIG. 22 shows an arrangement which is effective for improving the resolution of detection of the diffracted light by the pinhole 16. The lens 15 forms a Fourier transform pattern image where the distance between adjacent diffracted light spots is $\Delta \xi_i$ on an imaginary focal plane $FP_i$. This image is focused by an enlarging lens 15A as an enlarged image on the real focal plane FP. The distance $\Delta \xi$ between adjacent diffracted light spots is expressed as $$\Delta \xi = b/a \Delta \xi_i = kf_i \lambda \qquad (5)$$

where a denotes the distance between the plane $FP_j$ and the lens 15A, b the distance between the plane FP and the lens 15A, k a proportional constant, and $\lambda$ a wavelength of the coherent light.

Equation (5) indicates that the resolution of the apparatus can be improved by increasing the ratio b/a, increasing the wavelength $\lambda$ and/or the distance $f_j$. Particularly, a great effect can be obtained by increasing the ratio b/a. The enlarging lens 15A is provided for obtaining this effect.

Although the specific construction has been illustrated and described herein, it is not intended that the invention be limited to the elements and the construction or configuration disclosed. One skilled in the art will recognize the particular elements or subconstructions may be used without departing from the scope and spirit of the invention. For example, the invention is applicable for use in combination with the apparatuses disclosed in Japanese patent applications No. 31020/79 (U.S. Pat. No. 4,330,775) and No. 143228/79 (U.S. Pat. No. 4,360,269) by the same inventors as to the instant invention.

Furthermore, the components 44 to 48 shown in FIG. 14 can be replaced with an image processing module such as Model 203 by Deft Laboratories Inc., U.S.A.

What we claim is:

1. An apparatus for inspecting an object, comprising:
Fourier transform means for providing an output data corresponding to a Fourier transform pattern of a given region of an object containing substantially regularly arranged fundamental patterns;
extractor means coupled to the Fourier transform means, for extracting a single magnitude data representing a spatial frequency component of the order n from the output data, the magnitude of the order n component changing with variation of the size of fundamental patterns; and
first means coupled to the extractor means, for determining the average size of fundamental patterns according to the single magnitude data;
wherein the order n spatial frequency component is selected so that the rate of change or the differential coefficient of the magnitude of the order n component with respect to the variation of the size of patterns is substantially maximum.

2. An apparatus according to claim 1, wherein said Fourier transform means forms a Fourier transform pattern optically, and said extractor means extracts the order n diffracted light component of the image, the intensity of the order n diffracted light component being corresponding to the magnitude of the order n spatial frequency component.

3. An apparatus according to claim 2, wherein said Fourier transform means includes means for illuminating the given region of the object with coherent light, and a lens system for producing a Fourier transform pattern image containing spatial frequency components of the illuminated region of the object.

4. An apparatus according to any one of claims 1 to 3, wherein said first means calculates the specific data to provide the actual pattern size information.

5. An apparatus according to claim 2 or 3, wherein said extractor means includes an opening or spatial filter provided on a specific place where the image of the order n diffracted light component is formed, and a photoelectric converter for providing the electric signal corresponding to the single magnitude data.

6. An apparatus according to claim 5, wherein said opening is elongate in the direction of rotation of the order n diffracted light spots.

7. An apparatus according to claim 4, wherein said extractor means includes an opening or spatial filter provided on a specific place where the image of the order n diffracted light component is formed, and a photoelectric converter for providing the electric signal corresponding to the single magnitude data.

8. An apparatus according to claim 7, wherein said opening is elongate in the direction of rotation of the order n diffracted light spots.

9. An apparatus according to claim 1, wherein said Fourier transform means includes means for illuminating a given region of the object with incoherent light, and image sensor means for sensing an optical image of the illuminated region of the object producing output data representing a Fourier transform pattern image corresponding to the sensed optical image.

10. An apparatus according to any one of claims 1 to 3, wherein said first means includes memory means for storing a data table representing the relation between the single magnitude data and the variation of the size of patterns, and means for searching the data table to provide the actual pattern size information according to the single magnitude data.

11. An apparatus according to claim 4, wherein said first means includes memory means for storing a data table representing the relation between the single magnitude data and the variation of the size of patterns, and means for searching the data table to provide the actual pattern size information according to the single magnitude data.

12. An apparatus according to claim 5, wherein said first means includes memory means for storing a data table representing the relation between the single magnitude data and the variation of the size of patterns, and means for searching the data table to provide the actual pattern size information according to the single magnitude data.

13. An apparatus according to claim 6, wherein said first means includes memory means for storing a data table representing the relation between the single magnitude data and the variation of the size of patterns, and means for searching the data table to provide the actual pattern size information according to the single magnitude data.

14. An apparatus according to claim 7, wherein said first means includes memory means for storing a data table representing the relation between the single magnitude data and the variation of the size of patterns, and means for searching the data table to provide the actual pattern size information according to the single magnitude data.

15. An apparatus according to claim 8, wherein said first means includes memory means for storing a data table representing the relation between the single magnitude data and the variation of the size of patterns, and means for searching the data table to provide the actual pattern size information according to the single magnitude data.

16. An apparatus according to claim 9, wherein said first means includes memory means for storing a data table representing the relation between the single magnitude data and the variation of the size of patterns, and means for searching the data table to provide the actual pattern size information according to the single magnitude data.

17. An apparatus according to any one of claims 1 to 3, wherein said first means includes:
a pulse generator for generating a clock pulse, a first load pulse, a second load pulse and a third load pulse;
a first register receiving the first load pulse for storing a first data corresponding to the single magnitude data;
a first data memory receiving the first data for memorizing a specific relation between magnitude of the order n component and variation of the size of patterns, and providing a second data from a specific address thereof in accordance with the address designation by the first data;
a second register receiving the second load pulse for storing the second data indicating the variation of the order n component;
an X-counter for counting the clock pulse and providing an X-axis data;
a Y-counter for counting a carry out of the X-counter and providing a Y-axis data; and
a second memory receiving the third load pulse, the X- and Y-axis data, and the second data, for storing the variation of each Y-axis of the object and providing a display data representing the average variation value of the order in component.

18. An apparatus according to claim 4, wherein said first means includes:
a pulse generator for generating a clock pulse, a first load pulse, a second load pulse and a third load pulse;
a first register receiving the first load pulse for storing a first data corresponding to the single magnitude data;
a first data memory receiving the first data for memorizing a specific relation between magnitude of the order n component and variation of the size of patterns, and providing a second data from a specific address thereof in accordance with the address designation by the first data;
a second register receiving the second load pulse for storing the second data indicating the variation of the order n component;
an X-counter for counting the clock pulse and providing an X-axis data;
a Y-counter for counting a carry out of the X-counter and providing a Y-axis data; and
a second memory receiving the third load pulse, the X- and Y-axis data, and the second data, for storing the variation of each Y-axis of the object and providing a display data representing the average variation value of of the order n component.

19. An apparatus according to claim 5, wherein said first means includes:
a pulse generator for generating a clock pulse, a first load pulse, a second load pulse and a third load pulse;
a first register receiving the first load pulse for storing a first data corresponding to the single magnitude data;
a first data memory receiving the first data for memorizing a specific relation between magnitude of the order n component and variation of the size of patterns, and providing a second data from a specific address thereof in accordance with the address designation by the first data;
a second register receiving the second load pulse for storing the second data indicating the variation of the order n component;
an X-counter for counting the clock pulse and providing an X-axis data;
a Y-counter for counting a carry out of the X-counter and providing a Y-axis data; and
a second memory receiving the third load pulse, the X- and Y-axis data, and the second data, for storing the variation of each Y-axis of the object and providing a display data representing the average variation value of of the order n component.

20. An apparatus according to claim 6, wherein said first means includes:
a pulse generator for generating a clock pulse, a first load pulse, a second load pulse and a third load pulse;
a first register receiving the first load pulse for storing a first data corresponding to the single magnitude;
a first data memory receiving the first data for memorizing a specific relation between magnitude of the order n component and variation of the size of patterns, and providing a second data from a specific address thereof in accordance with the address designation by the first data;
a second register receiving the second load pulse for storing the second data indicating the variation of the order n component;
an X-counter for counting the clock pulse and providing an X-axis data;
a Y-counter for counting a carry out of the X-counter and providing a Y-axis data; and
a second memory receiving the third load pulse, the X- and Y-axis data, and the second data, for storing the variation of each Y-axis of the object and providing a display data representing the average variation value of of the order n component.

21. An apparatus according to claim 1, wherein the selected order of the spatial frequency component is found in the neighborhood of a point where an envelope of the spatial frequency components has a minimum level.

22. An apparatus according to any one of claims 1 to 3, further comprising:
level sensor means coupled to said first means, for providing a color signal when a processed data corresponding to the magnitude of the single magnitude data falls into a reference level;
color decoder means receiving the color signal, for decoding the color signal and providing a color display signal; and
color display means receiving the color display signal, for displaying two-dimensional color images corresponding to the average size of patterns in different colors for different average size ranges.

23. An apparatus according to claim 4, further comprising:
level sensor means coupled to said first means, for providing a color signal when a processed data corresponding to the magnitude of the single magnitude data falls into a reference level;
color decoder means receiving the color signal, for decoding the color signal and providing a color display signal; and
color display means receiving the color display signal, for displaying two-dimensional color images corresponding to the average size of patterns in different colors for different average size ranges.

24. An apparatus according to claim 5, further comprising:
level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

25. An apparatus according to claim 6, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

26. An apparatus according to claim 7, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

27. An apparatus according to claim 8, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

28. An apparatus according to claim 9, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

29. An apparatus according to claim 10, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

30. An apparatus according to claim 11, further comprising:

level sensor means coupled to said first means, for providing a color signal when a processed data corresponding to the magnitude of the single magnitude data falls into a reference level;

color decoder means receiving the color signal, for decoding the color signal and providing a color display signal; and color display means receiving the color display signal, for displaying two-dimensional color images corresponding to the average size of patterns in different colors for different average size ranges.

31. An apparatus according to any one of claims 1 to 3, wherein said Fourier transform means further includes means for enlarging the Fourier transform pattern image in order to improve the resolution of the apparatus.

32. An apparatus according to claim 4, wherein said Fourier transform means further includes means for enlarging the Fourier transform pattern image in order to improve the resolution of the apparatus.

33. An apparatus according to claim 5, wherein said Fourier transform means further includes means for enlarging the Fourier transform pattern image in order to improve the resolution of the apparatus.

34. An apparatus according to claim 6, wherein said Fourier transform means further includes means for enlarging the Fourier transform pattern image in order to improve the resolution of the apparatus.

35. An apparatus according to claim 7, wherein said Fourier transform means further includes means for enlarging the Fourier transform pattern image in order to improve the resolution of the apparatus.

36. An apparatus according to claim 8, wherein said Fourier transform means further includes means for enlarging the Fourier transform pattern image in order to improve the resolution of the apparatus.

37. An apparatus according to claim 9, wherein said Fourier transform means further includes means for enlarging the Fourier transform pattern image in order to improve the resolution of the apparatus.

38. An apparatus according to claim 10, wherein said Fourier transform means further includes means for enlarging the Fourier transform pattern image in order to improve the resolution of the apparatus.

39. An apparatus according to claim 11, wherein said Fourier transform means further includes means for enlarging the Fourier transform pattern image in order to improve the resolution of the apparatus.

40. An apparatus according to claim 12, wherein said Fourier transform means further includes means for enlarging the Fourier transform pattern image in order to improve the resolution of the apparatus.

* * * * *